United States Patent [19]

Simomura et al.

[11] Patent Number: 4,664,692
[45] Date of Patent: May 12, 1987

[54] HEAT TREATMENT FURNACE FOR GLASS

[75] Inventors: Katsuyasu Simomura, Mie; Kenji Ujiie, Matsusaka, both of Japan

[73] Assignee: Central Glass Company, Limited, Ube, Japan

[21] Appl. No.: 850,545

[22] Filed: Apr. 11, 1986

[30] Foreign Application Priority Data

Apr. 11, 1985 [JP] Japan .............................. 60-52762[U]

[51] Int. Cl.⁴ ............................................. C03B 29/00
[52] U.S. Cl. ..................... 65/182.2; 65/103; 65/107; 65/349; 65/374.13
[58] Field of Search ............... 65/103, 104, 107, 182.2, 65/349, 374.13

[56] References Cited

U.S. PATENT DOCUMENTS

| | | | |
|---|---|---|---|
| 3,223,501 | 12/1965 | Fredley et al. ................ | 65/182.2 X |
| 3,332,759 | 7/1967 | McMaster et al. ............. | 65/273 X |
| 3,375,093 | 3/1968 | Reising .............................. | 65/104 X |
| 4,059,427 | 11/1977 | Starr et al. ....................... | 65/349 X |

Primary Examiner—Arthur Kellogg
Attorney, Agent, or Firm—Schwartz, Jeffery, Schwaab, Mack, Blumenthal & Evans

[57] ABSTRACT

A gas hearth furnace for heat treatment of a plate glass consists of a plurality of aligned hearth beds on which a plate glass moves to be subjected to heat treatment. Four support pillars are provided for supporting each hearth bed through a pair of support blocks disposed along the opposite sides of the lower surface of the hearth bed. Each support pillar and each support block are made of a refractory having a coefficient of thermal expansion not higher than $10^{-7}/°$ C., thereby rendering negligible the fluctuation of vertical location of the hearth beds due to thermal expansion of a support structure including the support pillar and block.

21 Claims, 3 Drawing Figures

HEAT TREATMENT FURNACE FOR GLASS

BACKGROUND OF THE INVENTION

1. Field of the Invention

The present invention relates generally to an improvement in a glass heat treatment furnace such as an annealing furnace or a roller hearth furnace in which glass is subjected to heating or cooling while being transferred, and more particularly to a supporting structure for a plurality of roller supporting units aligned in the direction of the glass being transferred, each unit consisting of a plurality of parallely and spacedly arranged rollers for glass transferring, or for a plurality of bed units aligned in the same direction so that glass is transfered under assistance of gas layer, the bed units being, for example, hearth beds of a gas hearth furnace which beds are aligned in the glass transferring direction so that glass is heated to be bent.

2. Description of the Prior Art

In connection with, for example, conventional gas hearth furnaces, a support structure for each hearth bed consists of refractory support blocks disposed at the opposite sides of the bottom surface of the hearth bed. Each support block covered with a support frame made of stainless steel. Additionally, vertically standing support pillars are provided to support the bed at its four corners through the support block and frame. Each support pillar is made of metal and stands on a support stand which is provided with a device for adjusting the vertical location of the hearth bed. Thus, the supporting structure for the hearth bed is generally constructed of members made of metal and usual refractory.

Now, in order precisely bend a plate glass along the upper curved surface of the hearth bed of the thus arranged conventional gas hearth furnace, it is preferable that the clearance between the adjacent hearth beds is not larger than 1 mm and the difference in level of the top surfaces amoung the aligned hearth beds is not larger than 0.5 mm. However, the above-mentioned hearth bed structure consists of the metallic support pillars which have a high coefficient of thermal expansion, and therefore considerable differences in expansion length unavoidably occur among the support pillars due to temperature distribution in the furnace so that the support pillars are respectively heated at different temperatures upon operation of the furnace. This results in differences in level of the top surfaces among the aligned hearth beds even though the top surfaces of the hearth beds are adjusted to be brought into alignment with each other by means of the vertical location adjusting device at a low temperature before operation of the furnace. In this regard, it becomes necessary to precisely adjust the vertical location of the hearth beds at high temperatures during operation of the furnace. Such location adjustment at high temperatures is troublesome and requires much labor and much time, thereby lowering productivity of glass products.

SUMMARY OF THE INVENTION

A heat treatment furnace according to the present invention consists of a plurality of aligned heat-resistant units along which glass moves, each unit having a rectangular lower surface. A pair of support blocks are provided for each unit and disposed along the opposite sides of the unit lower surface and extend along the sides, in which two corners of the unit are contained in one side of the unit lower surface while the other two corners of the unit are contained in the other side of the unit lower surface. Each support block is made of a refractory having a coefficient of thermal expansion not higher than a predetermined level. Four support pillars are provided for each unit and vertically disposed parallel with each other, in which two pillars are adapted to support said unit at the two corners while the other two pillars are adapted to support the bed at the other two corners. Each support pillar is made of a refractory having a coefficient of thermal expansion not higher than the predetermined level.

By virtue of the fact that each support block and each support pillar are made of a low thermal-expansible refractory, the thermal expansion length of a unit support structure including the support block and the pillar is negligible even at high temperatures during operation of the furnace so that no difference in level of the upper surfaces is caused among the aligned units. This makes it unnecessary to adjust the vertical location of the units at high temperatures during furnace operation, thus greatly saving labor and time for production of glass products.

DESCRIPTION OF THE DRAWINGS

The features and advantages of the heat treatment furnace according to the present invention will be more clearly appreciated from the following description taken in conjunction with the accompanying drawings in which like reference numerals designate corresponding elements, in which.

DETAILED DESCRIPTION OF THE INVENTION

Figure 1:
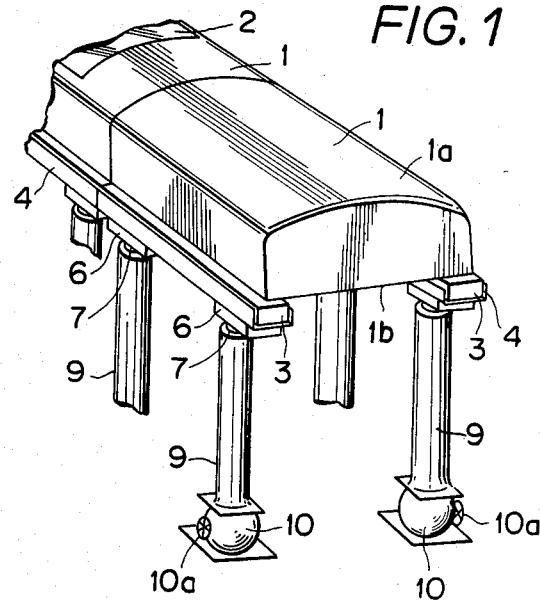
FIG. 1 is a perspective view of an essential part of an embodiment of a heat treatment furnace (a gas hearth furnace) for glass, in accordance with the present invention.
Figure 2:
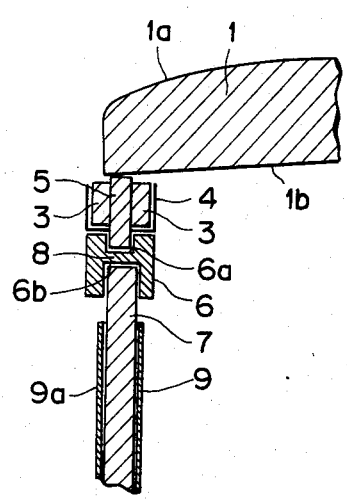
FIG. 2 is a vertical sectional view of a part of the furnace of FIG. 1, showing a support structure for a bed.

Referring now to FIGS. 1 and 2, there is shown an essential part of an embodiment of a heat treatment or gas hearth furnace for glass, in accordance with the present invention. The heat treatment furnace comprises a plurality of hearth beds 1 which are aligned with each other and made of a refractory having a low coefficient of thermal expansion. As shown in FIG. 1, each hearth bed is generally in the shape of a rectangular prism and is formed with a curved upper surface 1a and a flat lower surface 1b. Each hearth bed is formed at its upper surface with a plurality of small holes (not shown) through which gas is ejected thereby to cause a plate glass to float over the hearth bed upper surface 1a so that the plate glass 2 moves over the hearth bed upper surface 1a, thus accomplishing a so-called gas-floating process. In this instance, the plate glass 2 is bent as shown in FIG. 1 upon being transferred through the aligned hearth beds 1. The plate glass 2 is supported by a glass support device (not shown) which is attached to chains extended along the aligned hearth beds 1 and can move over the upper surfaces 1a of the hearth beds 1, so that the plate glass 2 is carried along the aligned hearth beds 1.

A pair of rectangular prism-shaped support blocks 3, 3 are disposed along the longitudinal opposite sides of the lower surface 1b of the hearth bed. Each support block 3 is made of a refractory having a coefficient of the thermal expansion not higher than about $10^{-7}/°C.$, the refractory being, for example a silica block having a purity not lower than 99.9%. This minimizes the longitudinal expansion of the support block 3 like of the hearth bed 1. A support frame 4 is disposed to cover each support block 3 and extended parallel with the support block 3. The support frame 4 is made of a metal and is generally channel-shaped so that the opposite side surfaces and the lower surface of the support block 3 are covered by the support frame 4. This support frame 4 prevents the support block 3 from being cracked and from dropping down if broken. It is preferable that the support block 3 is previously divided into two or three pieces for the purpose of facilitating handling thereof.

Four support pins 5 are provided for each hearth bed 1 in such a manner as to be in contact with the four corners of the lower surface 1b of each hearth bed 1. Each support pin 5 is disposed passing through support block 3 and the support frame 4 and has an upper end in contact with the hearth bed lower surface 1b. The support pin 5 is made of a refractory having a low coefficient of thermal expansion similar to that of the refractory of the support block 3. The lower end of the support pin 5 is inserted into the upper fitting hole 6a of a connector 6 which also has a lower fitting hole 6b formed coaxially with the upper fitting hole 6a. The upper and lower fitting holes 6a, 6b are separated from each other by a partition wall 8. The partition wall 8 has a thickness not more than 20 mm, taking account of thermal expansion upon heating, in which the thickness is sufficient to be about 5 mm in practice.

Four support pillars 7 are provided for each hearth bed 1 and are connected to conectors 6. Each support pillar 9 forms part of a support structure for the hearth bed and has an upper end inserted into the lower fitting hole 6b of the connector 6. Each support pillar 7 is made of a refractory having a coefficient of thermal expansion similar to that of the refractory of support block 3, and is vertically mounted on a support stand 9. The support stand 9 is preferably formed with a cylindrical section 9a covering the support pillar 7 with the support pillar upper end section remaining uncovered, thereby preventing the support pillar 7 from being cracked and broken down if damaged. A thread-operated jack 10, as a vertical location adjustment means, is fixedly installed at the lower end of each support stand 9, thereby making possible manual adjustment of the vertical location of the hearth bed upon rotation of a handle 10a. Accordingly, the upper surfaces 1a of the hearth beds 1 can be brought into alignment with each other in case the base of the furnace is not horizontal and/or in case the hearth beds are slightly different in thickness or height from each other.

Figure 3:
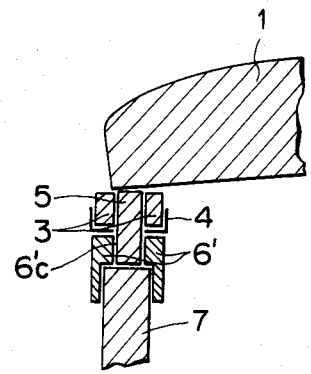
FIG. 3 is a vertical sectional view similar to FIG. 2, but showing another embodiment of the heat treatment furnace in accordance with the present invention.

FIG. 3 illustrates a second embodiment of the heat treatment furnace according to the present invention which is similar to the first embodiment of FIGS. 1 and 2 with the exception that the connector 6' is not provided with the partition wall so that upper and lower fitting holes merge with each other to form a through-hole 6'c. The through-hole 6'c includes an upper small-diameter section into which the support pin 5 is inserted, and a lower large-diameter section into which the support pillar 7 is inserted, so that the support pin 5 is in direct contact with the support pillar 7. Accordingly, in this instance, the thermal expansion of the connector 6' does not effect any change in vertical location of the hearth bed 1. As shown, in this embodiment, the cross-sectional areas of each support pin 5 and each support pillar 7 are different from those of the first embodiment, respectively. Consequently, the size of the connector 6' of this embodiment is also different from that of the first embodiment.

In order to facilitate understanding of the present invention, a further detailed explanation will be made. As stated above, since each support block 3 is made of a low thermal expansible refractory like the hearth beds 1, the thermal longitudinal expansion difference does not arise between the hearth bed and the support block, so that a gap does not occur between the adjacent hearth beds 1, 1 and of course between the adjacent support blocks 3, 3. Furthermore, each support pin 5 and each support pillar 7 are made of a low thermal-expansible refractory like the hearth and the support block, and only a relatively thin or no partition wall is provided between the support pin 5 and the support pillar 7, the partition wall forming part of the connector 6. Accordingly, the vertical thermal expansion is very slight in a hearth bed support device as a whole since the vicinity of the support stand 9 is hardly thermally affected. As a result, there does not arise a difference in level among the aligned hearth beds 1 to provide trouble during operation.

As mentioned above, each support block 3, each support pin 5 and each support pillar 7 are made of a refractory having a coefficient of thermal expansion not higher than about $10^{-7}/°C.$ The corresponding refractory is, for example, a high purity silica block which is suitable for mass production and readily available. The material of each support frame 4 and each connector 6 is suitably selectable from a variety of metals, in which the material is preferably stainless steel which is excellent in strength and in heat-resistance and is readily available.

In the case where, for example, the length of each support pin 5 is 100 mm, the length of each support pillar is 1,000 mm, and the thickness of the partition wall of each connector 6 made of stainless steel is 5 mm (the thermal expansion of the support stand 9 is negligible), the expansion length of each hearth bed support device including the support pin 5 and the support pillar 6 and the connector 6 when heated at 700° C. is calculated as follows:

$$(100 \text{ mm} \times 5.7 \times 10^{-7}/°C. + 5 \text{ mm} \times 10^{-5}/°C. + 1,000 \text{ mm} \times 5.7 \times 10^{-7}/°C.) \times 700° C. \approx 0.50 \text{ mm}$$

where $5.7 \times 10^{-7}/°C.$ is the coefficient of thermal expansion of silica; and $10^{-5}/°C.$ is the coefficient of thermal expansion of stainless steel.

As appreciated from the above, the upper surfaces 1a of the hearth beds 1 are kept in alignment with each other as far as there is no fluctuation in dimensions among them, even if the glass heat treatment of gas hearth furnace is heated nonuniformly. If there arise slight differences in expansion length among the hearth bed support devices, such slight expansion length differences are negligible in practical operation. Thus, since the upper surfaces of the hearth beds 1 are always nearly in alignment with each other, it is unnecessary to adjust the vertical position of the hearth beds during operation at high temperatures, thereby saving labor and time for glass heat treatment. This greatly contributes to an increase in productivity of glass products.

While the support pins 5 have been shown and described as forming part of the hearth bed support device of the heat treatment furnace, it will be understood that the support pins may be omitted so that the support blocks 3 are in direct contact with the lower surface of the hearth bed 1.

What is claimed is:

1. A heat treatment furnace for glass, comprising:
a plurality of aligned heat-resistance units along which glass moves, each unit having a rectangular lower surface;
first and second support blocks disposed along first and second opposite sides of said unit lower surface and extending along said sides, said first side contianing first and second corners of said unit lower surface, said second side containing third and fourth corners of said unit lower surface, each support block being made of a refractory having a coefficient of thermal expansion not higher than a predetermined level; and
first, second, third and fourth support pillars vertically disposed parallel with each other, said first and second support pillars being for supporting said unit at said first and second corners through said first support block, said third and fourth support pilars being for supporting said unit at third and fourth corners through said second support block, each support pillar being made of a refractory having a coefficient of thermal expansion not higher than said predetermined level.

2. A heat treatment furnace employing a gas-floating process, comprising:
a plurality of aligned heat-resistant beds along which glass moves, each bed having a rectangular lower surface;
first and second support blocks disposed along first and second opposite sides of said bed lower surface and extending along said sides, said first side containing first and second corners of said bed lower surface, said second side containing third and fourth corners of said bed lower surface, each support block being made of a refractory having a coefficient of thermal expansion not higher than a predetermined level; and
first, second, third and fourth support pillars vertically disposed parallel with each other, said first and second support pillars being for supporting said bed at said first and second corners through said first support block, said third and fourth support pillars being for supporting said bed at third and fourth corners through said second support block, each support pillar being made of a refractory having a coefficient of thermal expansion not higher than said predetermined level.

3. A heat treatment furnace as claimed in claim 2, further comprising first and second support frames made of a heat-resistant material, each support frame extending along said bed lower surface first and second sides to cover first and second support blocks, respectively.

4. A heat treatment furnace as claimed in claim 3, further comprising first, second, third and fourth support pins made of a refractory having a coefficient of thermal expansion not higher than said predetermined level, said first and second pins being disposed passing through said first support block and support frame and in contact with said bed first and second corners, said third and fourth pins being disposed passing through said second support block and support frame and in contact with said bed at said third and fourth corners.

5. A heat transfer furnace as claimed in claim 4, further comprising first, second, third and fourth connectors made of a heat-resistant material, each connector being disposed to connect each support pin and each support pillar.

6. A heat treatment furnace as claimed in claim 5, wherein each connected support pin and support pillar are coaxially aligned with each other.

7. A heat treatment furnace as claimed in claim 5, wherein said connector is formed with a first hole into which said support pin is inserted, and a second hole into which said support pillar is inserted.

8. A heat treatment furnace as claimed in claim 7, wherein said connector is formed with a partition wall for separating said first and second holes from each other so that said support pin and said support pillar are prevented from contacting each other.

9. A heat treatment furnace as claimed in claim 7, wherein said support pin and said support pillar are in contact with each other.

10. A heat treatment furnace as claimed in claim 2, further comprising first, second, third and fourth cylindrical support stands made of a heat-resistant metal, each support pillar being disposed within a cylindrical support stand.

11. A heat treatment furnace as claimed in claim 10, further comprising first, second, third and fourth means disposed beneath each cylindrical support stand for adjusting the vertical location of said cylindrical support stand.

12. A heat treatment furnace as claimed in claim 2, wherein each support block has a rectangular cross-section.

13. A heat treatment furnace as claimed in claim 3, wherein each support frame is channel-shaped.

14. A heat treatment furnace as claimed in claim 2, wherein said predetermined level is $10^{-7}/°C$.

15. A heat treatment furnace as claimed in claim 2, wherein each support block is formed of silica block having a predetermined high purity.

16. A heat treatment furnace as claimed in claim 15, wherein said predetermined high purity is not lower than 99.9%.

17. A heat treatment furnace as claimed in claim 3, wherein said heat-resistant material is stainless steel.

18. A heat treatment furnace as claimed in claim 4, wherein said predetermined level is $10^{-7}/°C$.

19. A heat treatment furnace as claimed in claim 18, wherein each support pin is formed of a silica block having a predetermined high purity.

20. A heat treatment furnace as claimed in claim 19, wherein said predetermined high purity is not lower than 99.9%.

21. A heat treatment furnace as claimed in claim 5, wherein said heat-resistant material is stainless steel.

* * * * *